United States Patent [19]

Brouwer

[11] 3,889,010

[45] June 10, 1975

[54] PROCESS FOR THE PREPARATION OF A PROTEIN FOOD PRODUCT

[75] Inventor: Anton H. J. Brouwer, Velp (Gld.), Netherlands

[73] Assignee: Akzo N.V., Arnhem, Netherlands

[22] Filed: Oct. 26, 1972

[21] Appl. No.: 300,975

[52] U.S. Cl.............................. 426/276; 426/802
[51] Int. Cl. .............................................. A23j 3/00
[58] Field of Search .................... 99/14, 17, 18, 20; 426/276; 264/181, 202

[56] References Cited
UNITED STATES PATENTS

| | | | |
|---|---|---|---|
| 2,730,448 | 1/1956 | Boyer et al. | 426/276 |
| 3,047,395 | 7/1962 | Rusoff et al. | 426/104 |

Primary Examiner—James R. Hoffman
Attorney, Agent, or Firm—Stevens, Davis, Miller & Mosher

[57] ABSTRACT

A process for preparing a protein food product in which the protein material is dissolved in an aqueous liquid, the liquid is foamed and is extruded into a coagulant at which time coagulation is taking place the foamed protein material is being drawn. The drawn material is subsequently dried to a product having a fibrous cohesive texture. In the foaming of the protein-containing aqueous liquid it is preferred that it take place in an alkaline medium having a pH in the range of between 8 and 13 with the protein concentration being between 10 and 15 percent by weight of the liquid.

12 Claims, 1 Drawing Figure

PATENTED JUN 10 1975　　3,889,010
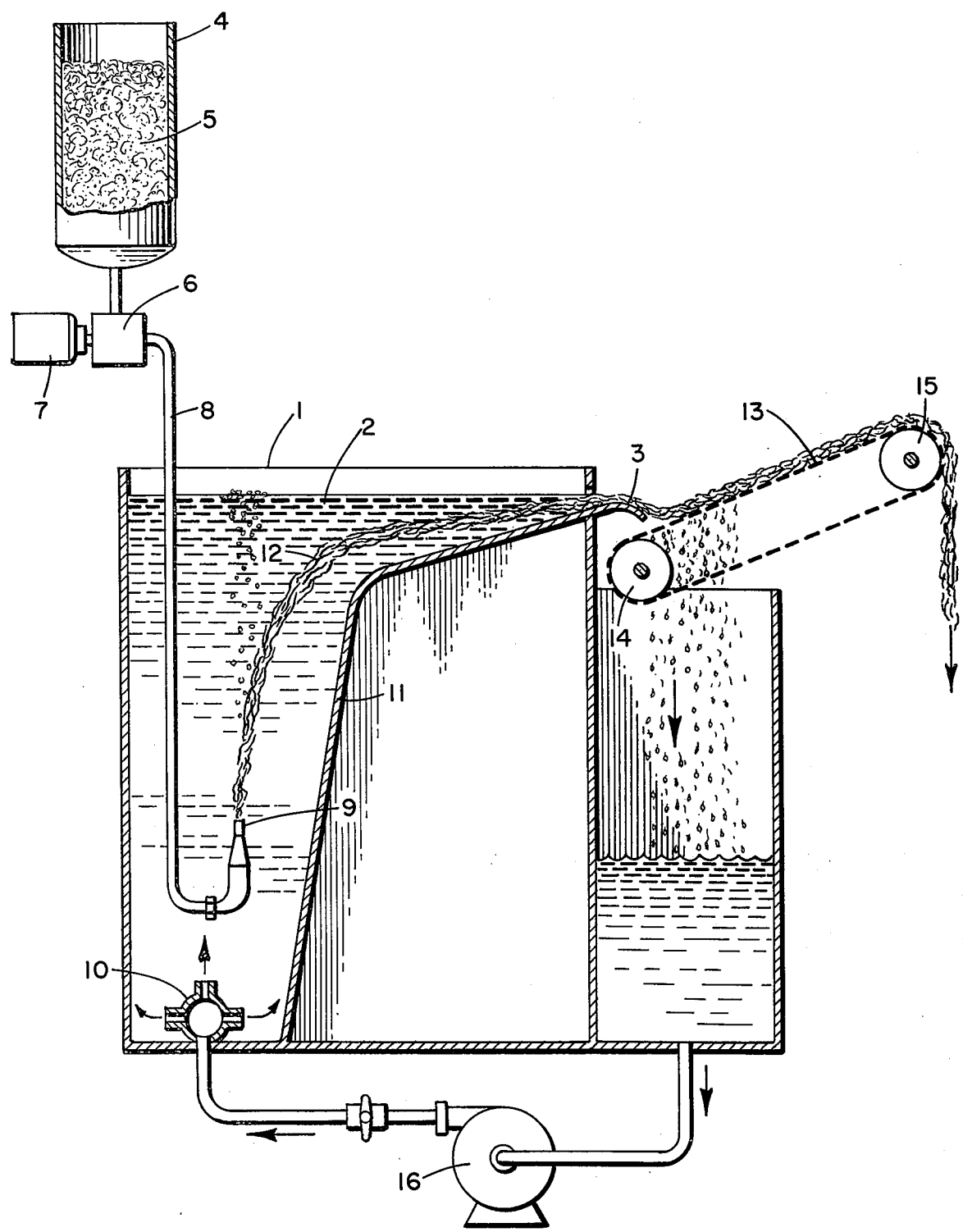

PROCESS FOR THE PREPARATION OF A PROTEIN FOOD PRODUCT

The invention relates to a process for the preparation of a protein food product having a fibrous, cohesive texture, which process comprises dissolving protein in an aqueous liquid, and coagulating and drying the protein material, and relates to a food product thus prepared.

It is known in U.S. Pat. No. 3,047,395 to process a high-protein material by comminuting it into a homogeneous mass which is formed into a paste or slurry by the addition of an aqueous liquid. The resulting mass is introduced into a reaction vessel, preferably an autoclave, fitted with an agitator. The slurry is heated to approximately 200°C. in a few minutes, with vigorous stirring, followed by cooling said slurry as rapidly as possible to a temperature less than approximately 90°C. The resulting shred-like solid mass is separated by decantation or other common means. In this way there is obtained a high-protein material having a fibrous, cohesive texture.

However, the known process has the disadvantage that the product obtained by it is relatively impure on account of a very high proportion of the non-protein-aqueous constituents being included in the coagulate. Although the final structure holds together cohesively, the chewiness of the product is not as good as that of beef.

The present invention provides a process by which the aforementioned drawbacks are obviated.

The invention is characterized by the steps of foaming up the protein liquid, extruding the foam thus obtained into a coagulant and drawing the foam as it coagulates.

Omission of the drawing step during coagulation has been found to yield a product which does not have a fibrous, cohesive texture but rather resembles beaten egg white.

Also, it is not feasible to draw the coagulated foam, since it will break when the draw ratio applied is too low to obtain a product having a distinctly fibrous, cohesive texture and the desired chewiness.

To obviate these drawbacks, the present invention provides a process in which the drawing of the foam takes place entirely or mainly before completion of the coagulation.

The drawing may be carried out in any one of several ways. It is generally done by subjecting the foam to external mechanical forces. To this end use is made of drawing devices such as rolls or transport belts which pull the coagulating foam through the coagulant.

A protein foam drawn in this way results in obtaining a product having a fibrous, cohesive structure.

For technical reasons it is generally preferred to have the coagulation take place in a coagulating bath, although the use of other coagulating media such as gases may be employed.

It has now been found that a very properly fibrillated product may be obtained, if the coagulant used is a liquid and the foam stream emerging from the extrusion opening is extruded in a substantially vertical direction and is drawn by the upward thrust that the foam stream experiences in the liquid coagulant.

The more air the foam contains the greater will be the upward thrust and, consequently, the higher will be the degree of drawing.

The degree of drawing can still be increased if the process is so carried out that the liquid coagulant is passed along the foam in the direction of the extrusion thereof. The drag of the liquid on the foam stream promotes the drawing thereof.

The structure of the end product is not only influenced by the percentage of air, but also by the size of the air bubbles. Also of influence is the protein concentration in the foam, the type of mixer by which air is introduced into the foam, and the liquid coagulant. Another important factor is the temperature at which the coagulation takes place, since the coagulation will proceed more rapidly as the temperature is raised.

The fibrillary product formed may be withdrawn from the bath with the aid of a discharge device positioned below or above the level of the coagulant.

It is not only important that the drawing of the foam should be largely effected during coagulation but also that the degree of drawing plays an essential role in obtaining a product having a fibrous, cohesive texture and the desired chewiness. The degree of drawing is dependent on the nature of the protein, the speed of coagulation and the density of the foam. The present invention therefore provides a process in which the coagulation takes place in a coagulating bath, and in which the ratio of the rate at which the drawn and coagulated foam is discharged from the coagulating bath to the squirting rate of the foam issuing from the extrusion opening is higher than 1.3, but preferably in the range of from 1.5 to 2.0.

For carrying out the process according to the present invention use may be made of all types of protein which can be formed into a relatively stable foam and which decompose hardly or not under the process conditions chosen. Suitable protein materials are meat scraps, beef liver, fish, egg white, yeast, etc. However, it is preferred to use a soy protein. The last mentioned protein has the advantage of being inexpensive and unusually stable and will hardly if at all be subject to denaturation when employed in the process according to the present invention.

For the purpose of the present invention the starting material also may be made up of protein mixtures or of proteins to which carbohydrates or sugars have been added.

Also suitable for incorporation into the protein to be foamed up are particular amino-acids such as lysine. Moreover, special coloring, flavoring and aromatic materials may be added in this stage.

The protein foam may be prepared in a simple manner by foaming up an aqueous liquid containing the protein food product.

However, in order to obtain the highest possible yield as well as a foam of maximum stability, it is preferred that foaming up should take place in an alkaline medium having a pH in the range between 8 and 13. For the same reason it is preferred to use a protein concentration in the range of between 10 and 15 percent.

The process may be conducted in batch or continuous operation. In continuous operation the foam is rapidly processed, which permits a reduction of the period over which it must remain stable.

In order to effectively prevent decomposition of the protein it is preferred to keep the pH as low as possible, say between 8 and 9.

To prevent the product from having a compact structure instead of a fibrous texture and chewiness, the protein solution must be agitated to a homogeneous foam. Favorable results are obtained by the application of a process in which the protein solution is foamed up, with air being introduced to an air content of approximately 50 percent by volume or higher.

For coagulating the protein there are a great many known coagulants such as salt solutions, acids, alcohols, etc. Also the use of a particular temperature may serve as a means of obtaining coagulation. Alternatively coagulation may be effected in a hot gas. It has been found that the coagulation must not proceed too rapidly because also then the product would have a compact structure and poor chewiness.

To circumvent this problem the present invention provides a process in which the coagulant used is a polar organic solvent, preferably propanol or ethanol.

In view of the toxic properties of certain organic solvents it is preferred to use ethanol. The coagulation speed may be influenced by the use of a coagulating bath made up of mixtures of coagulation-improving liquids to which diluents may have been added.

The product thus obtained is next neutralized, washed and dried. To prevent the product from gelling as it is neutralized, which would cause the fibrillary structure to be disturbed, the neutralization is carried out with the aid of a strongly dilute solution of a weak acid.

For the same reason it is preferred that the product should be washed out with an alcohol-water mixture instead of with pure water.

Also the drying temperature must not be chosen too high, because if it is there is again the risk of the fibrillary structure being disturbed. Favorable results are in general obtained at a temperature of approximately 50°C. The product obtained in this way, after the addition thereto, if required, of ingredients such as flavoring and coloring agents as well as of aromatic materials, is excellently suitable for human consumption, either as such or in admixture with other food products. The product according to the present invention retains its structure upon boiling, frying or roasting. It is excellently suited for incorporation into natural fish or meat and manufactured snacks.

These and other features of the present invention will be more evident from the following description, made with reference to the examples and attached drawing, in which:

The FIGURE represents a coagulating and drawing apparatus in longitudinal section.

Coagulation tank 1 is filled with a liquid coagulant 2 up to the level of overflow edge 3. In vessel 4 is a supply of foam 5 which is pumped through a conduit 8 to a slit-shaped extrusion opening 9 with the aid of a gear pump 6, which is driven by a motor 7. This opening 9 is positioned below the level of liquid 2 and is vertically directed upwards. The extrusion opening 9 may be fixed at various depths in a manner not indicated here.

The liquid coagulant 2 is supplied through a perforated pipe 10 provided near the bottom of tank 1. A curved partition 11 serves to guide the liquid stream past the extrusion slit 9 to overflow edge 3, as a result of which said liquid stream entrains the coagulated foam stream 12. The coagulated foam 12 is discharged from the bath by means of a perforated transport belt 13 which is mounted on rollers 14 and 15. The liquid coagulant 2 flows through this belt 13 to the suction opening of a pump 16 which pumps the liquid to the perforated tube 10.

If desired, the composition of the coagulating bath may be maintained by the application of correction liquids for the liquid coagulant 2, which liquids may be supplied via a conduit not shown.

EXAMPLE I

To an aqueous solution of sodium hydroxide with pH 13 there was added a protein extract of soybean sold under the trademark Promin D up to an amount of about 10 percent by weight. The mixture was vigorously agitated for 15 minutes, with air being introduced.

All or at least most of the protein was dissolved and a foam was formed with an air content of about 75 percent by volume.

The foam thus obtained was extruded in vertical direction by forcing it through a slit measuring 50 by 2 mm which opened about 25 cm below the surface of the liquid in the coagulating bath. The foam was extruded at a rate of 5 meters per minute.

The coagulating bath was made up of ethanol and was acidified with acetic acid to a pH in the range of from 4.0 to 4.5.

In this way a very finely fibrillary product was obtained.

The product was carefully washed with an alcohol/water mixture and dried at 50°C. The fine fibrillary structure was maintained during washing and drying.

EXAMPLE II

A vessel provided with an agitator was filled with water to one third its capacity.

A dilute sodium hydroxide solution (12.5 percent by weight) was used to raise the pH to approximately 13, followed by the addition to the solution obtained of Promin D in an amount of about 14 percent by weight. The mass was vigourously agitated for 10 – 15 minutes with air being introduced. All or at least most of the protein was dissolved and a foam was formed. The foam thus obtained was found to be fairly stable and could be kept up for 30 minutes. The foam was extruded in a horizontal direction by forcing it through a slit which opened below the surface of a propanol coagulating bath, followed by withdrawing it therefrom with the use of a small horizontal conveyor belt and a roller, both of which operated at the same speed.

The foam was extruded at a rate of 5 meters per minute while the conveyor belt travelled at a speed of 7.5 meters per minute. After neutralization with a small amount of acetic acid the product obtained was properly washed with an alcohol/water mixture and dried at 50°C. The product obtained was an ultra fine fibrillary coagulate whose structure strongly resembled that of meat.

Boiling, frying or roasting did not result in any loss of structure.

EXAMPLE III

The neutralized product of Example II was dried at 50°C., washed with an alcohol/water mixture and redried at 50°C. Drying the product prior to washing caused the fibrillary structure to be maintained even better during washing than in the procedure followed in Example II.

What is claimed is:

1. A process for the preparation of a protein containing food product having a fibrous, cohesive texture, which comprises dissolving an edible protein containing material in an aqueous liquid, foaming said protein-containing liquid so that the foam contains up to 50% by volume of protein containing liquid, extruding the foamed protein-containing liquid into a non-toxic coagulant, drawing said foamed protein material as it coagulates and drying the protein material.

2. The process of claim 1 wherein the drawing of the foam takes place entirely or mainly before completion of the coagulation.

3. The process of claim 1 wherein the coagulant is a liquid and the foam stream is extruded in substantially a vertical direction in a bath and is drawn by the upthrust the foam stream experiences in the coagulant.

4. The process of claim 3 wherein the degree of drawing is increased by passing the liquid coagulant along the foam in the direction of extrusion thereof.

5. The process of claim 1 wherein the ratio of the rate at which the drawn and coagulated foam is discharged from the coagulating bath to the squirting rate of the foam issuing from the extrusion opening is higher than 1.3.

6. The process of claim 5 wherein the ratio is from 1.5 to 2.0.

7. The process of claim 1 wherein the starting material used for the preparation of the protein foam is a soy protein.

8. The process of claim 1 wherein the foam is prepared by foaming up an aqueous alkaline protein solution having a pH in the range between 8 and 13 and a protein concentration between approximately 10 and 15 percent.

9. The process of claim 1 wherein the protein-containing solution is foamed up with air being introduced to an air content of approximately 50 percent by volume or higher.

10. The process of claim 1 wherein the coagulant used is a polar organic solvent.

11. The process of claim 10 wherein said solvent is propanol.

12. The process of claim 10 wherein said solvent is ethanol.

* * * * *